United States Patent Office 2,899,470
Patented Aug. 11, 1959

2,899,470
PURIFICATION OF POLYALKYLPHENOLS

Emanuel Goldstein, Paramus, and Robert M. Lusskin, Haworth, N.J., assignors to The Trubek Laboratories, Rutherford, N.J., a corporation of New Jersey No Drawing. Application September 7, 1956
Serial No. 608,437

10 Claims. (Cl. 260—624)

This invention relates to methods for the separation of phenols and is directed particularly to methods for the purification or recovery of diortho substituted phenols from mixtures containing the same.

The separation and purification of polyalkyl phenols, and particularly diortho substituted phenols, has heretofore presented considerable difficulty by reason of the similarity in physical properties of the various phenols which are frequently present in mixtures thereof. As a result, conventional methods used in the separation of compounds, such as fractional crystallization or fractional distillation, are not generally successful. The separation of tertiary butyl cresols presents a typical problem of this character. Thus the production of the commercially important 2,6-ditertiary butyl-4-methyl phenol is accompanied by the formation of the corresponding mono tertiary butyl compound whose presence is undesired in the final product and results in darkening of the product and the development of an unpleasant odor upon exposure to the air. Previous methods of crystallization or fractionation of such mixtures have resulted in only partial separation of the phenols and consequently have yielded impure products. Methods of purification by solvent extraction of such mixtures of phenols have been suggested, but they require the use of large amounts of special solvents which must subsequently be removed. Moreover, the methods make it necessary to employ several operative steps and considerable equipment in order to complete the process. Furthermore, 2,6-ditertiary-butyl-4-methyl phenol retains the last traces of solvent with unusual tenacity so that the extracted phenol product must be dried for long periods of time in order to obtain a product of high quality.

In accordance with the present invention, the separation and purification of diortho alkyl substituted phenols may be effected very readily while only a single vessel need be used in carrying out the process. At the same time, the completeness of the separation and the purity of the end product is considerably improved.

The advantages of the present invention are attained by reacting mixed phenols with a trialkyl borate. It has been discovered that those phenols which have alkyl substituents in both ortho positions will not react with trialkyl borates to produce phenolic borate esters, whereas phenols having one or both ortho positions available will combine with trialkyl borates to produce compounds which may be readily separated from the diortho substituted phenols. The phenols which have reacted with the borate can be recovered by hydrolysis, and as a result, such phenols also can be obtained in a relatively pure form.

The principal objects of the present invention are to simplify the separation of diortho alkyl substituted phenols from mixtures thereof with other phenolic compounds and to provide processes for obtaining diortho alkyl substituted phenols of increased purity.

A further object of the invention is to effect the separation of diortho alkyl substituted phenols from mixtures thereof containing other phenolic compounds by selectively reacting said other phenols with a trialkyl borate to produce a phenolic borate ester separable from unreacted diortho alkyl substituted phenol.

A specific object of the invention is to provide improved methods for purifying 2,6-ditertiary-butyl-4-methyl phenol.

These and other objects and features of the present invention will appear from the following description thereof in which typical procedures are cited for the purpose of illustration and in order to indicate the nature of the present invention but without intending to limit the scope of the invention thereby.

The reaction which takes place between trialkyl borates and those phenols which have at least one unsubstituted carbon atom in the ortho position may be represented by the equation

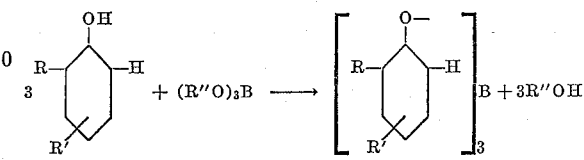

wherein R is hydrogen or alkyl, and R' and R" are alkyl. The borates formed may contain 1, 2 or 3 phenol groups per molecule.

The reaction is generic in character and applies to all phenols which have a hydrogen atom in the ortho position with respect to the hydroxyl group. However, diortho alkyl substituted phenols do not react with trialkyl borates. As a result, the process may be used in any case wherein diortho alkyl substituted phenols are to be separated from other phenols or phenolic impurities.

Trialkyl borates are used in carrying out the process in order to assure the desired selective esterification of the phenolic impurities to be separated from the diortho alkyl substituted phenols. The boric acid ester chosen for use in any particular process should form a borate ester of the reactive phenolic impurities which differs sufficiently in boiling point or other characteristics from the diortho alkyl substituted phenol of the mixture to permit easy separation of the unreacted phenol from the phenol borate ester, and from the alcohol or other reaction products formed in the course of the reaction. Typical trialkyl borates which may be used are tri-methyl borate, tri-ethyl borate, tri-propyl borate, tri-isobutyl borate, tri-normal butyl borate, tri (2-ethyl hexyl) borate and the like. In general those trialkyl borates in which the alkyl groups contain from 2 to 8 carbon atoms are preferred and when purifying 2,6-ditertiary-butyl-4-methyl phenol, it is preferable to use tri-isobutyl borate.

In carrying out the reaction, the mixture of phenols from which the diortho alkyl substituted phenol is to be separated, or the diortho substituted phenol to be purified, is heated with the selected trialkyl borate. The reaction mixture may then be fractionally distilled to separate the reaction products, using a vacuum during the distillation operation if desired. In most instances the liberated alcohol is first distilled over, after which the excess trialkyl borate comes off and finally the purified diortho alkyl substituted phenol distills over leaving the phenol borate ester in the still.

For ease of operation, the reaction is preferably carried out at a temperature above the melting point of the mixture of phenols. Thus, the temperatures of from about 70° C. to 175° C. are generally employed. A reaction temperature of about 150° C. is preferred in which case the reaction is usually completed within about one hour. However, the duration and temperature of the reaction between the phenols and trialkyl borate can be varied considerably. It is ordinarily desirable to use an excess of the trialkyl borate, say about twice the theoretical amount required to react with the active phenol of the mixture being treated.

In order to illustrate typical procedure in accordance with the present invention, the following examples are cited.

*Example I*

500 grams of crude 2,6-ditertiary butyl-4-methyl phenol having a solidification point of 67.0° C. and containing about 2% of mono butyl-4-methyl phenol were heated to 150° C. with 9.4 grams of tri-isobutyl borate in a flask aquipped with a distilling column. The pressure was lowered to 100 mm. of mercury and several grams of isobutanol were distilled from the reaction mixture. The pressure was then gradually lowered to 10 mm. of mercury over a period of one hour. The mixture was fractionated and the solidification points of the fractions were found to be as follows:

| °C | Below 68.0 | 68.1–68.4 | 68.5–68.9 | 69.0–69.3 | 69.4 | 69.5 | 69.6 |
|---|---|---|---|---|---|---|---|
| Percent distillate | 2.6 | 4.6 | 3.6 | 10.9 | | 15.9 | 59.5 |

Water was added to the borate ester of monobutyl-4-methyl phenol remaining in the still and upon steam distillation of the mixture, the mono butyl-4-methyl phenol was liberated and recovered in substantially pure form.

By way of comparison, 500 grams of the same crude 2,6-ditertiary butyl-4-methyl phenol were fractionated directly with the same equipment without previous treatment with tri-isobutyl borate. The solidification points of the fractions obtained from the untreated sample were as follows:

| °C | Below 68.0 | 68.1–68.4 | 68.5–68.9 | 69.0–69.3 | 69.4 | 69.5 | 69.6 |
|---|---|---|---|---|---|---|---|
| Percent distillate | 10.8 | 6.9 | 7.2 | 19.6 | 53.7 | | |

The main fraction obtained from the mixture treated with tri-isobutyl borate, representing 59.5% of the charge and having a solidification point of 69.6, was allowed to stand exposed to air for several weeks. No darkening in color occurred. The material remained white and had a mild, pleasant odor. The Gardner number of the melt was 0–1.

By comparison, the principal fraction obtained from the untreated material, representing 53.7% of the charge and having a solidification point of 69.4, was slightly yellow upon distillation. It turned a deep yellow upon exposure to air for two weeks and had an unpleasant odor. The Gardner number of the melt was 3–4, which is considerably darker than the product obtained by treatment in accordance with the present invention.

*Example II*

A mixture of 50% 2,6-ditertiary butyl-4-methyl phenol and 50% tertiary butyl-3-methyl phenol was heated according to the conditions of Example I with tri-isobutyl borate. The tri-isobutyl borate was in 10% excess over theory based on the tertiary butyl-3-methyl phenol present. Upon fractionation 2,6-ditertiary butyl-4-methyl phenol containing only 3.8% mono-tertiary butyl-3-methyl phenol was obtained.

*Example III*

The experiment in Example II was repeated but 4-octyl phenol (equal to the weight of 2,6-ditertiary butyl-4-methyl phenol) was used in place of mono tertiary butyl-3-methyl phenol. Upon fractionation 2,6-ditertiary-butyl-4-methyl phenol containing only 5.6% 4-octyl phenol was obtained.

*Example IV*

The experiment of Example II was repeated with tri (2-ethyl hexyl) borate in place of tri-isobutyl borate. After the reaction, the distillate was heated with 10% sodium hydroxide to hydrolyze the excess tri (2-ethyl hexyl) borate. The 2,6-ditertiary butyl-4-methyl phenol was then fractionated. It contained 10.8% mono tertiary-butyl-3-methyl phenol.

It will be apparent from the foregoing examples that the present process lends itself to inexpensive commercial adaptation by reason of its simplicity and ease of operation. The method may be carried out using one piece of apparatus such as a vessel equipped with a distilling column, and since no solvents are required, the equipment can be used to capacity. Furthermore, the extensive drying procedures heretofore required are not used in accordance with the present invention.

In the alternative, the process can be carried out in two steps, in the first of which the phenols and borate are reacted, and in the second of which the fractional distillation of the reaction products is effected.

Following the fractional distillation of the reaction mixture, the phenols which have reacted with the trialkyl borates can be recovered by hydrolysis. If the phenols are volatile with steam, they may be steam distilled. In the alternative, the phenol borates produced can be hydrolyzed and purified by any other suitable methods preferred.

The present invention has been found to be particularly useful in purifying 2,6-ditertiary-butyl-4-methyl phenol to obtain a clear, pleasant-smelling product which remains unchanged upon exposure to the air. The superior quality and stability of the 2,6-ditertiary-butyl-4-methyl phenol thus obtained is of commercial importance since this product is used in commerce with materials wherein deterioration is highly disadvantageous.

The invention is nevertheless of general application for the purification or separation of diortho alkyl substituted phenols from other phenolic compounds and has its greatest utility in purifying those phenols in which the alkyl substituents in the ortho position are relatively bulky i.e. contain 2 or more carbon atoms. The conditions under which the reactions are carried out and the type of equipment employed may, of course, be varied considerably and will depend largely upon the type of phenols being treated and the particular boric acid ester employed in conducting the reaction. It should therefore be understood that the particular examples set forth above have been cited for the purpose of indicating typical and preferred practice in accordance with the present invention and are not intended to limit the scope of the invention.

What we claim is:

1. The method of separating diortho tertiary alkyl substituted phenol from a phenolic compound which has at least one unsubstituted ortho position which comprises the steps of heating a mixture containing said phenolic compounds with a trialkyl borate at a temperature above the melting point of the mixture the amount of the trialkyl borate employed being at least sufficient to react with a substantial portion of the phenolic compound having an unsubstituted ortho position, and thereafter fractionally distilling the reaction mixture and separately collecting the diortho alkyl substituted phenol as it distills over.

2. The method of separating diortho tertiary alkyl substituted phenol from a phenolic compound which has at least one unsubstituted ortho position which comprises the steps of heating a mixture containing said phenolic compounds with a trialkyl borate at a temperature of about 70 to 175° C. the amount of the trialkyl borate employed being at least sufficient to react with a substantial portion of the phenolic compound having an unsubstituted ortho position, and thereafter fractionally distilling the reaction mixture and separately collecting the diortho alkyl substituted phenol as it distills over.

3. The method of purifying 2,6-ditertiary butyl-4-methyl phenol which comprises the steps of heating the impure material containing a phenolic compound which has at least one unsubstituted ortho position with a trialkyl borate to a temperature between about 70 and 175° C. for a period of about 1 hour, the amount of the trialkyl borate employed being at least sufficient to react with a substantial portion of the phenolic compound having an unsubstituted ortho position, and thereafter fractionally distilling the reaction mixture and separately collecting the 2,6-ditertiary butyl-4-methyl phenol as it distills over.

4. The method of purifying 2,6-ditertiary butyl-4-methyl phenol which comprises the steps of heating the impure material containing a phenolic compound which has at least one unsubstituted ortho position with a tri-isobutyl borate to a temperature between about 70 and 175° C. for a period of about 1 hour, the amount of the tri-isobutyl borate employed being at least sufficient to react with a substantial portion of the phenolic compound having an unsubstituted ortho position, and thereafter fractionally distilling the reaction mixture and separately collecting the 2,6-ditertiary butyl-4-methyl phenol as it distills over.

5. A method of purifying 2,6-ditertiary butyl-4-methyl phenol wherein the impure material containing a phenolic compound which has at least one unsubstituted ortho position is heated to a temperature of from about 70 to 175° C. with a trialkyl borate in which each alkyl group contains from 2 to 8 carbon atoms the amount of the trialkyl borate employed being at least sufficient to react with a substantial portion of the phenolic compound having an unsubstituted ortho position, and the reaction mixture is then fractionated to recover substantially pure 2,6-ditertiary butyl-4-methyl phenol.

6. A method of obtaining purified 2,6-ditertiary butyl-4-methyl phenol having a high solidification point and of light color and mild odor by heating an impure 2,6-ditertiary butyl-4-methyl phenol containing a phenolic compound having at least one unsubstituted ortho position with tri-isobutyl borate at about 70 to 175° C., the amount of the tri-isobutyl borate employed being at least sufficient to react with a substantial portion of the phenolic compound having an unsubstituted ortho position, then fractionating and recovering 2,6-ditertiary butyl-4-methyl phenol.

7. The method of separating a diortho tertiary alkyl substituted phenol from a phenolic compound which has at least one unsubstituted ortho position which comprises the steps of heating a mixture containing such phenolic compounds with a trialkyl borate to a temperature of from about 70 to 175° C., the amount of the trialkyl borate employed being at least sufficient to react with a substantial portion of the phenolic compound having an unsubstituted ortho position, and thereafter separating the unreacted diortho alkyl substituted phenol from the reaction mixture.

8. The method of separating diortho tertiary alkyl substituted phenol from a phenolic compound which has at least one unsubstituted ortho position which comprises the steps of heating a mixture containing said phenolic compounds with a trialkyl borate in which each alkyl group contains from 2 to 8 carbon atoms to a temperature of from about 70 to 175° C., the amount of the trialkyl borate employed being at least sufficient to react with a substantial portion of the phenolic compound having an unsubstituted ortho position, and thereafter fractionally distilling the reaction mixture and separately collecting the diortho alkyl substituted phenol as it distills over.

9. The method of separating diortho tertiary alkyl substituted phenol from a phenolic compound which has at least one unsubstituted ortho position which comprises the steps of heating a mixture containing said phenolic compounds with tri-isobutyl borate to a temperature of from about 70 to 175° C., the amount of tri-isobutyl borate employed being at least sufficient to react with a substantial portion of the phenolic compound having an unsubstituted ortho position, and thereafter fractionally distilling the reaction mixture and separately collecting the diortho alkyl substituted phenol as it distills over.

10. The method of separating diortho tertiary alkyl substituted phenol from a mixture containing the same together with a phenolic compound which has at least one unsubstituted ortho position which comprises the steps of selectively esterifying said other phenol by heating the mixture to a temperature of about 70 to 175° C. with a trialkyl borate, the amount of the trialkyl borate employed being at least sufficient to react with a substantial portion of the phenolic compound having an unsubstituted ortho position, and separating the diortho alkyl phenol from the phenol borate ester produced.

References Cited in the file of this patent

UNITED STATES PATENTS

| | | |
|---|---|---|
| 2,260,336 | Prescott et al. | Oct. 28, 1941 |
| 2,260,337 | Prescott et al. | Oct. 28, 1941 |
| 2,587,753 | O'Connor et al. | Mar. 4, 1952 |
| 2,606,936 | Michael | Aug. 12, 1952 |